(12) United States Patent
Dier et al.

(10) Patent No.: US 8,568,071 B2
(45) Date of Patent: Oct. 29, 2013

(54) RAILCAR SAFETY SYSTEM

(76) Inventors: Otis D. Dier, Altadena, CA (US); Thomas S. Broderick, Yucaipa, CA (US)

( * ) Notice: Subject to any disclaimer, the term of this patent is extended or adjusted under 35 U.S.C. 154(b) by 28 days.

(21) Appl. No.: 13/341,574

(22) Filed: Dec. 30, 2011

(65) Prior Publication Data
US 2013/0168033 A1 Jul. 4, 2013

(51) Int. Cl.
*B61D 45/00* (2006.01)

(52) U.S. Cl.
USPC .......................................... 410/118

(58) Field of Classification Search
USPC .......................................... 410/118
See application file for complete search history.

(56) References Cited

U.S. PATENT DOCUMENTS

| | | |
|---|---|---|
| 276,053 A | 4/1883 | Henry |
| 3,527,319 A | 9/1970 | Pedley |
| 3,695,698 A | 10/1972 | Trump |
| RE28,788 E * | 4/1976 | Williamson, III ............ 410/118 |
| 4,215,895 A | 8/1980 | Phillips |
| 4,436,466 A * | 3/1984 | Marino ........................ 410/118 |
| 4,964,771 A * | 10/1990 | Callihan ...................... 410/118 |
| 5,452,973 A | 9/1995 | Arvin |
| 5,458,447 A * | 10/1995 | Clason ......................... 410/100 |
| 5,833,413 A * | 11/1998 | Cornelius ..................... 410/119 |
| 6,152,664 A * | 11/2000 | Dew et al. .................... 410/100 |
| 6,186,274 B1 | 2/2001 | Reynolds |
| 6,655,887 B2 * | 12/2003 | McDonald .................... 410/118 |
| 6,702,533 B1 * | 3/2004 | Williams et al. .............. 410/118 |
| 6,758,306 B2 | 7/2004 | Walls |
| 6,935,819 B2 * | 8/2005 | Squyres ....................... 410/104 |
| 6,948,896 B2 | 9/2005 | Zhan |
| 7,014,053 B2 | 3/2006 | Calleja |
| 7,175,378 B2 | 2/2007 | Brown et al. |
| 7,357,610 B2 * | 4/2008 | Squyres ....................... 410/104 |
| 2004/0016362 A1 * | 1/2004 | Cencer et al. ................ 105/355 |
| 2008/0131226 A1 | 6/2008 | Pesson |
| 2011/0017094 A1 * | 1/2011 | Cencer et al. ................ 105/355 |

* cited by examiner

*Primary Examiner* — H Gutman

(74) *Attorney, Agent, or Firm* — Jeffrey G. Sheldon; Sheldon Mark & Anderson

(57) ABSTRACT

A railcar safety system utilizes a flexible net system removably secured across an open end of the railcar.

17 Claims, 4 Drawing Sheets

RAILCAR SAFETY SYSTEM

BACKGROUND

Multi level railcars are used for transporting such goods as vehicles. They typically have a bottom level and a top level for a bi-level car. A tri-level railcar has a middle level between the bottom level and the top level.

A challenge when loading and unloading such railcars or performing maintenance on the railcars is the risk of workers falling out of the end of the railcar, thereby injuring themselves.

A variety of systems for securing goods and/or for safety are known, such as those disclosed in U.S. Pat. Nos. 6,186,274; 0,276,053; 4,215,895; 7,175,378; 3,527,319; 7,014,053; 3,695,698; 5,452,973; 6,758,306; and 6,948,896, and U.S. Patent Publication No. 20080131226.

These prior systems suffer from one or more disadvantages that makes them non-optimum for use in railcars, such as inadequate safety, difficulty in use, or interfering with egresses and entrance into the railcar. Accordingly, there is a need for a better safety system for such railcars that does not interfere with egress and entrance.

SUMMARY

The present invention is directed to a safety system that satisfies this need. In one version of the invention a rail car safety net has a top and is formed of straps including opposed side straps. The net has a tie-on section, also referred to as an attachment section that extends beyond the top suitable for attachment to another net. Each tie-on section optionally has a plurality of connectors for connecting another net thereto for use in multiple level rail cars.

In another aspect of the invention a rail car having an exit at least eight feet wide defined by side walls has a flexible net removably secured across only a portion of the exit. The net is sufficiently large to block at least 50% of the width of the exit, but sufficiently small to leave an egress and entrance about two feet wide between the net and one of the side walls. Preferably there is an egress and entrance about two feet wide between the net and both of the side walls.

For an installation with a tri-level railcar, a flexible net system is removably secured in place. The tri-level railcar has a bottom level, a middle level and a top level. The bottom level has a floor, and the top level has a roof. There is a first divider between the middle level and the bottom level and a second divider between the middle level and the top level. Each level has an exit at least eight fee wide defined by side walls of the railcar. The net system comprises a lower segment for the bottom level, a central segment for the middle level, and an upper segment for the top level. Each segment comprises criss-crossed straps with a bottom strap, a top strap, opposed side straps, a side strap attachment device secured to about the longitudinal middle of each side strap, and an attachment section extending beyond the top strap, where the attachment section optionally has a plurality of attachment devices. The lower segment is removably attached to the floor by a pair of hooks, the central segment is removably attached to the first divider by a pair of hooks, and the upper segment is removably attached to the second divider by a pair of hooks. Each lower segment attachment segment is removably secured to one of the middle segment side strap attachment devices. Each central segment side strap is removably secured to one of the upper segment side strap attachment devices. Each upper segment side strap is removably secured by a hook to the roof, and there is a ratchet for each upper segment attachment segment for tightening.

If the bi-level version of the invention the railcar has only a bottom level and a top level with a divider between. The net system has a lower segment removably secured to the floor by a pair of bottom hooks and an upper segment removably attached to the roof by a pair of top hooks. The upper segment is removably attached to the divider by a pair of top segment bottom hooks. Multiple techniques can be used for anchoring the lower segment attachment segment. In one technique, each lower attachment segment is removably secured to one of the upper segment bottom hooks. In a second technique, each lower attachment segment is removably secured to the divider. In a third technique, each lower attachment segment is removably secured to one of the upper segment side strap attachment devices. There can be a ratchet for each attachment segment for tightening.

DRAWINGS

These and other features, aspects, and advantages of the present invention will become better understood with regard to the following description, appended claims, and accompanying drawings where:

DESCRIPTION

Figure 1:
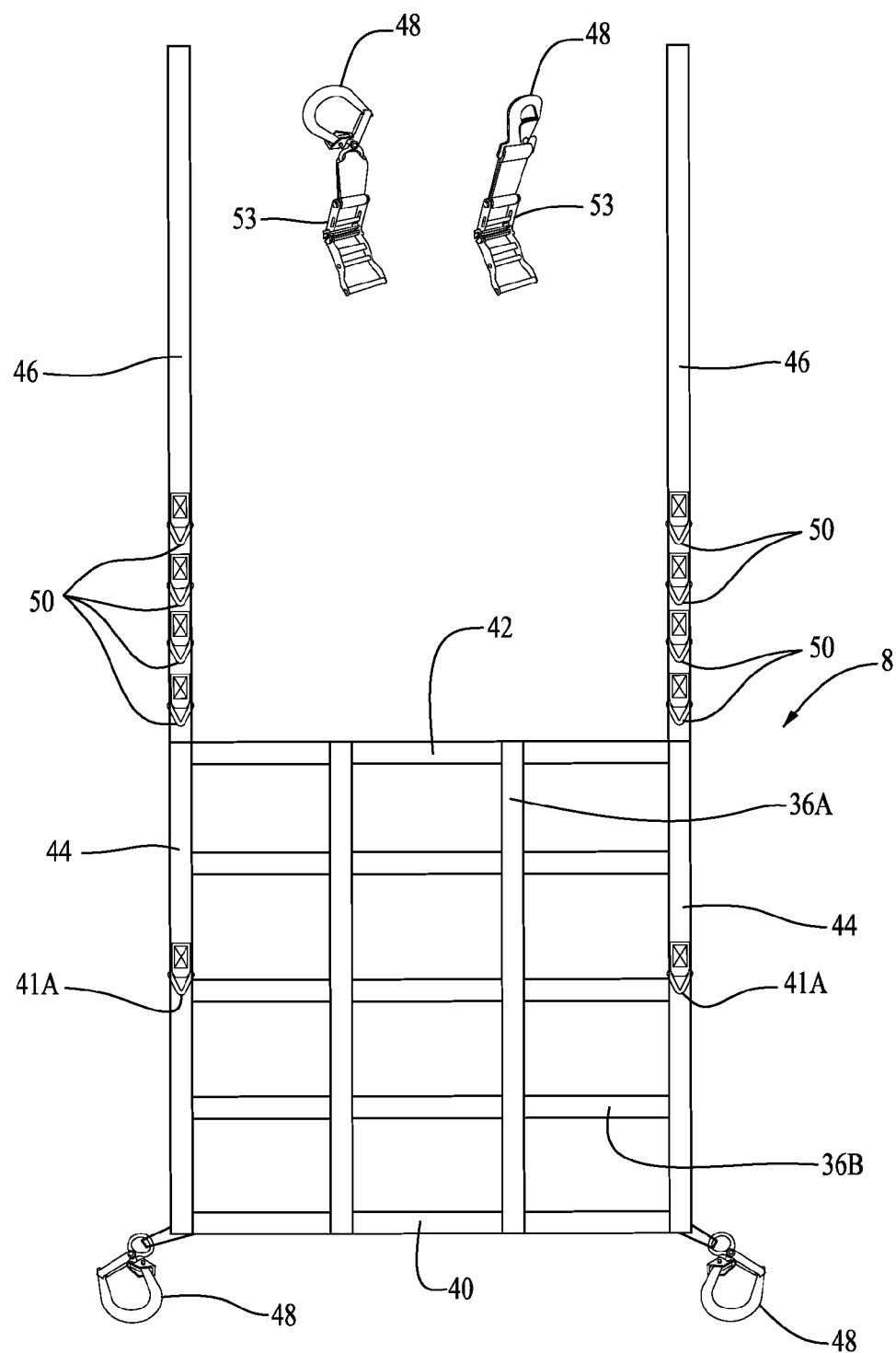
FIG. 1 is a front elevation view of a net segment according to the present invention, partially exploded.
Figure 2:
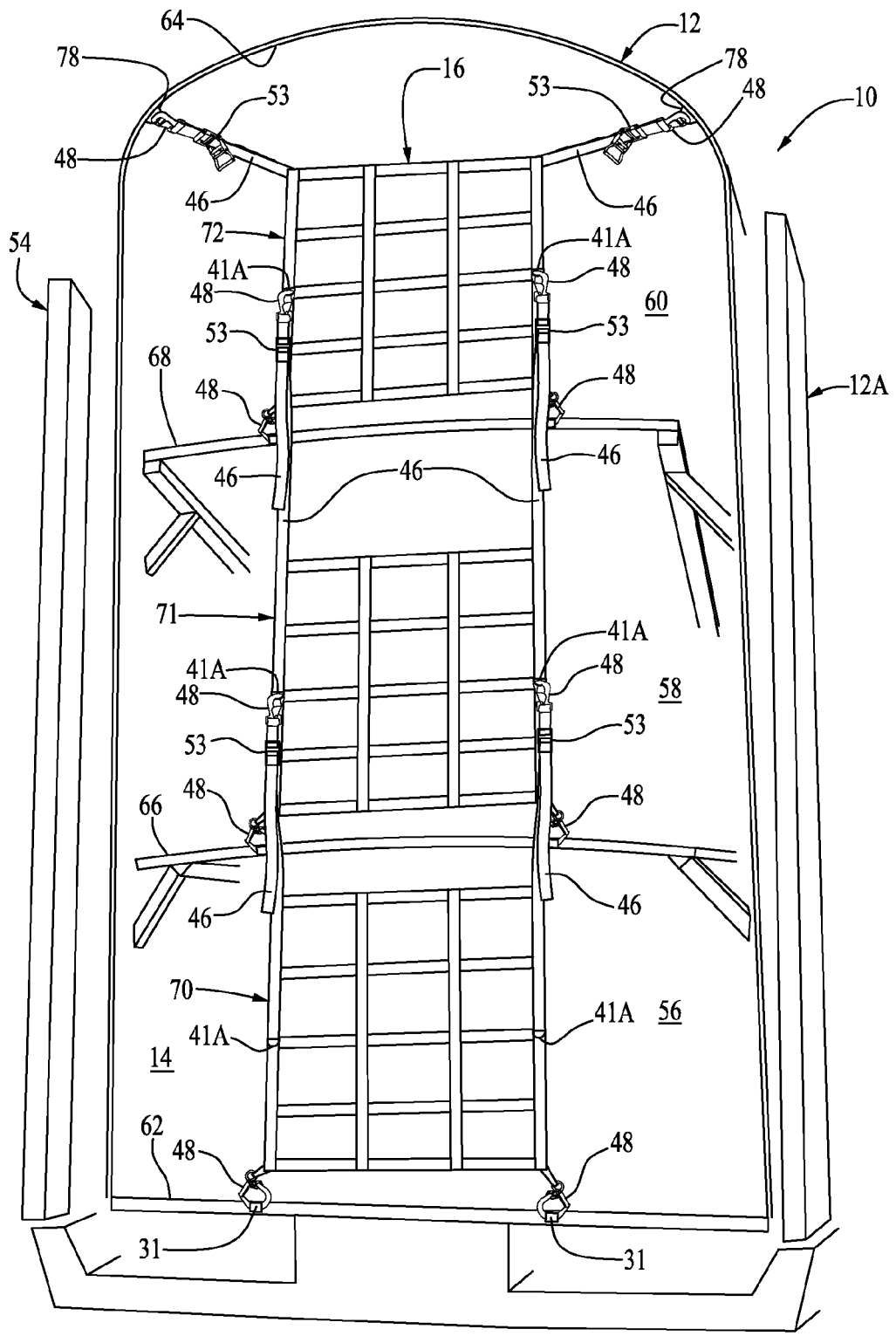
FIG. 2 is a rear elevation view of a tri-level railcar having a net system installed.
Figure 3:
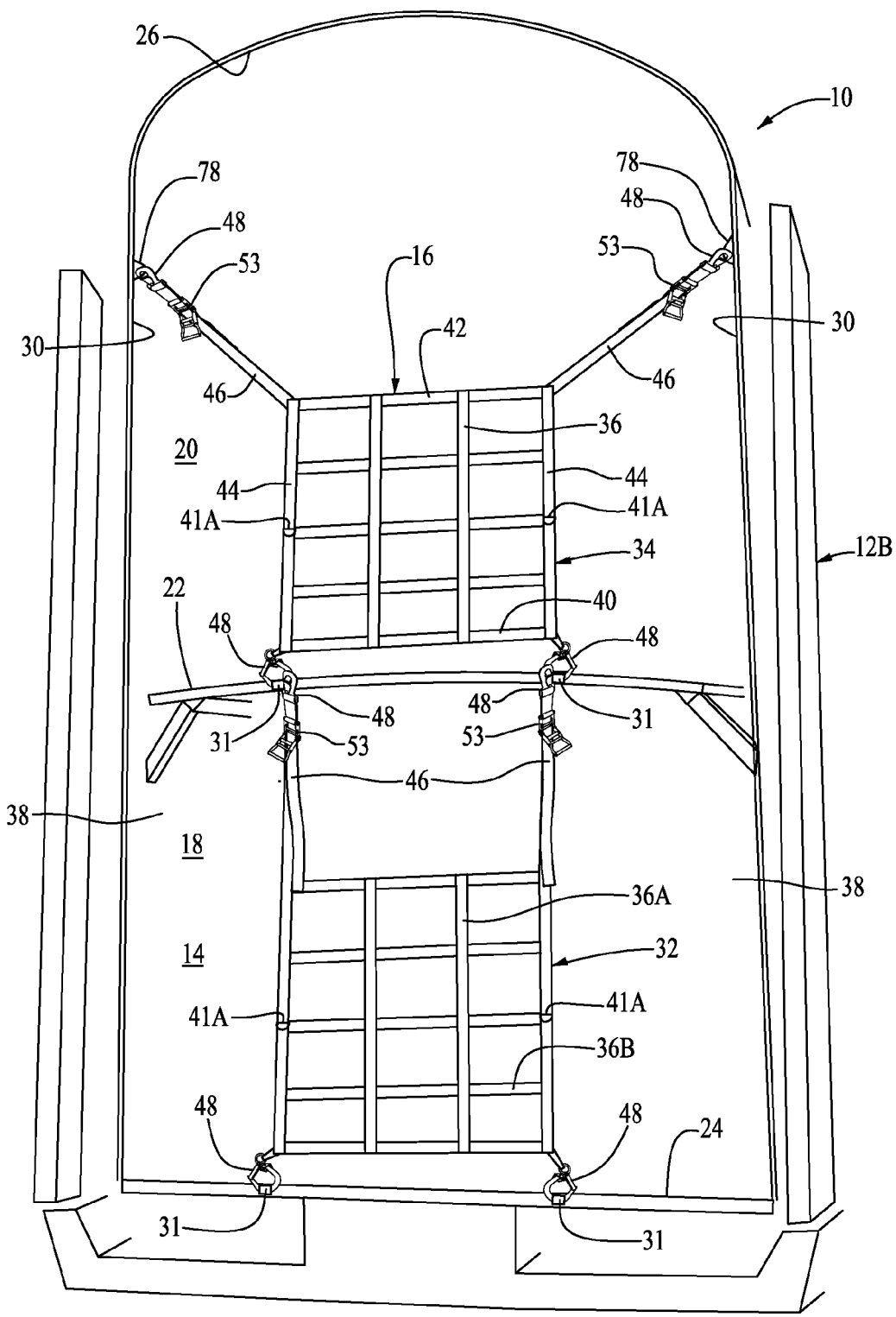
FIG. 3 is a rear elevation view of a bi-level railcar having a net system installed using a first technique.
Figure 4:
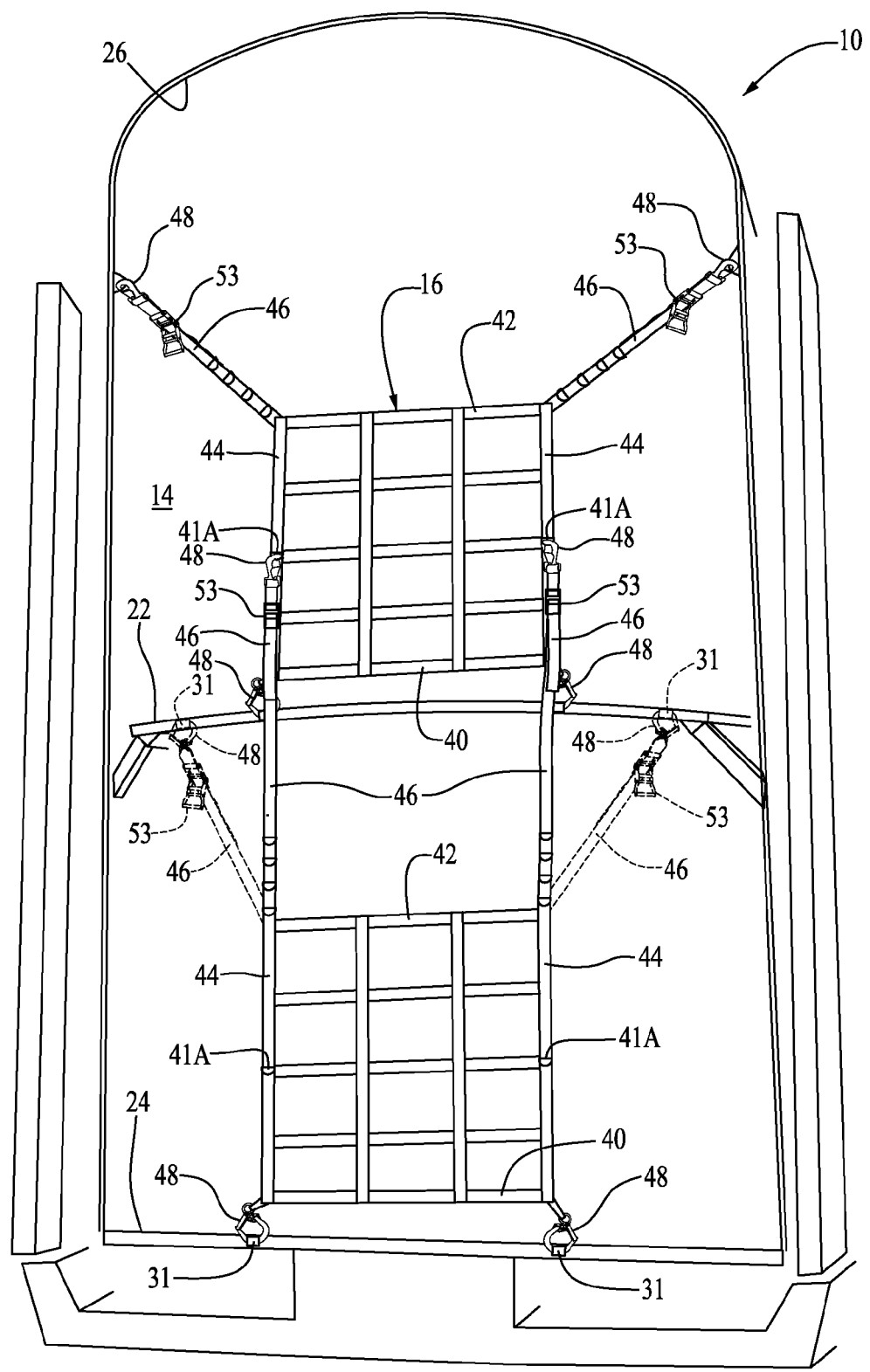
FIG. 4 is a rear elevation view of a bi-level railcar having a net system installed using two other techniques.

With regard to FIG. 1, there is shown a net segment 8 useful for a railcar safety system. As shown in FIGS. 2-4, a railcar safety system 10 comprises a conventional railcar 12 having an open end 14 protected with a flexible net system 16. The railcar 12A shown in FIG. 2 is a tri-level system, i.e., there are three compartments for goods such as vehicles, while the railcar 12B shown in FIGS. 3 and 4 is a bi-level railcar. Railcar 12B has a bottom level 18 and a top level 20 with a divider 22 therebetween running the length of the railcar. The divider 22 serves as the roof for the bottom level 18 and the floor for the top level 20. The bottom level has a floor 24 and the top level 20 has a roof 26 and the railcar 12B has side walls 30. As is conventional, each floor has an anchor 31 for an attachment point, which is conventionally referred to as bridge eye. A bridge eye is a short piece of tubing welded into the floor, proximate to the side walls 30 of the railcar 12.

The net system 16 of FIG. 3 comprises two segments 8 of netting, namely a lower segment 32 and an upper segment 34. The netting can be made of any suitable flexible material of sufficient strength to help prevent a worker from falling out of the railcar. Preferably it is made of a criss-cross pattern of horizontally oriented and vertically oriented straps 36 where the vertically oriented straps 36A can be stitched to the horizontally oriented straps 36B. The straps can be about two inches wide and typically are formed of nylon, preferably of a bright, visible color such as yellow or orange so that they are visible to the workers on the railcar to provide a visual warning that they are reaching the open end of the railcar.

Although only the rear end of the railcar is shown in the FIGS. 2-4, this is just for convenience, and either end of the railcar can be considered the rear end, and both the rear and the front ends can have similar configurations for the purpose of this invention. Typically the railcar is about 8 feet wide at the opening shown, and each level has a height of about 60 inches.

The net segments are sized so that when the netting is stretched taut, there is a peripheral gap between the netting and the roof, floor, and side walls of the rail car at each level. For example the netting segments when stretched taut can be about 43 inches wide and about 40 inches from a bottom strap 40 to a top strap 42, and when centrally positioned, leave a gap of about two feet on each side, and a gap of about 15 inches at the top and about 5 inches at the bottom. It is desirable to have a gap 38 at lest two feet wide between each netting segment and the railcar side wall 30 on at least one side, and more preferably on both sides, for ease of egress from and entrance into the rail car by workers. Without such a gap 38, it would be necessary to remove or bend the netting each time a worker desired to enter or leave the railcar, thereby resulting in operational inefficiencies and increased costs. Thus preferably each net segment is sufficiently large to block at least 50% of the cross-sectional area of its respective exit while leaving an egress and entrance at least two feet wide between the net segment and each of the side walls.

Each netting segment preferably comprises criss-crossed straps with the bottom strap 40, a top strap 42, opposed side straps 44, and an attachment segment 46, also referred to as a tie-on segment or section, which extends beyond the top strap 42. What is considered to be the top strap and the bottom strap is arbitrary and used for convenience in the way the netting system is ordinarily installed, i.e., from bottom up. It is possible to install it from top down, and thus what is referred to here as the bottom strap would become the top strap and the top strap would become the bottom strap. The attachment segments 46 extend at an angle away from the criss-crossed straps to reach attachment anchors as described below. Each attachment segment 46 typically is a strap stitched to criss-crossed straps at the intersection of the side strap 44 and top strap 42. It is typically a two inch wide strap.

Two types of attachment devices can be used with the railcar safety system for attaching the netting segments to the railcar. One type is removable hooks, preferably latching hooks 48, which optionally can be locking. A preferred hook is Crosby Model No. S-320M available from The Coordinated Companies in Wilmington, Calif. Another type of attachment device can merely be a ring, such as a D-ring 50 where optionally a plurality of attachment devices, typically four, are secured to the strap attachment segment 46 by stitching a retaining loop and spaced apart form each other by about four inches. There can also be an attachment device 41A at about the longitudinal middle of each side strap 44, and optionally positioned on another strap or not at the longitudinal middle. By the term "longitudinally middle" there is meant the approximate midpoint of the longitudinal axis of the side strap.

The terms "attach" and "secure" are used herein interchangeably and have the same meaning. By "removably attach" and "removably secure" there is meant the object can be attached and unattached by hand without the use of tools.

With regard to FIG. 2, a tri-level railcar 54 has a bottom level 56, a middle level 58, and a top level 60. The bottom level 56 has a floor 62, the top level 60 has a roof 64, and there is a first divider 66 between the bottom level 56 and the middle level 58, and a second divider 68 between the middle level 58 and the top level 60. The first divider 66 serves as the roof of the bottom level 56 and the floor or the middle level 58, and the second divider 68 serves as the floor of the middle level 58 and the roof of the top level 60.

A lower segment 70 of the netting system is removably secured to the floor 62 by a pair of hooks 48, a central segment 71 is removably attached or secured to the first divider 66 by a pair of hooks 48, and an upper segment 72 is removably attached to the second divider 68 by a pair of hooks 48. Each lower segment 70 attachment segment 46 is removably to one of the middle segment side strap attachment devices 41A utilizing a hook. Preferably each central segment attachment segment 46 is removably secured to one of the upper segment side strap attachment devices 41A utilizing a hook 48. Preferably each upper segment 72 attachment segment 46 is removably secured by a hook 48 to the roof 64 or an upper portion of one of the side walls. The attachment to the roof 26 or upper side wall portion can be to a conventional type connection mechanism used on railcars, such as a baffle plate 78. Preferably there is a ratchet mechanism 53 for each upper segment 72 attachment segment 46 for tightening the net system. A suitable ratchet tightening mechanism is available from Kinedyne Corporation, Part Number 811. Preferably, as shown in FIG. 1, a hook/ratchet assembly is used where the hook and ratchet mechanism are connected to each other with a strap. The attachment segment 46 is threaded into the ratchet mechanism and secured therein.

The optional attachment devices such as the D-rings 50 allow for connecting the netting in unusual railcar configurations, providing flexibility in use of the invention. An advantage of having multiple attachment devices 50 is this allows for adjustment as necessary and allows accommodation of railcars of differing heights.

In one version of a bi-level configuration, as shown in FIG. 3, a lower segment 32 of netting is removably attached to the floor 24 by a pair of hooks 48, one for each side of the netting. The upper segment 34 is removably attached to the roof 26 or an upper portion of one of the side walls by a pair of hooks 48. The attachment to the roof 26 or an upper portion of one of the side walls can be to a conventional type connection mechanism used on railcars, such as a baffle plate. The upper segment is removably attached to the divider 22 by another pair of hooks 48. Each lower segment 32 is removably secured to one of the upper segment bottom hooks such as by using the hook 48. To tighten the netting, a ratchet mechanism 53 is used on upper segment attachment sections to leave very little play in the netting to provide security across the railcar opening.

In another version of a bi-level configuration, as shown in FIG. 4, the attachment segments 46 are connected as in the tri-level configuration with each lower segment attachment segment 46 removably secured to one of the upper segment side strap attachment devices 41A utilizing a hook 48, and optionally a hook/ratchet assembly as shown in FIG. 1.

In another version of a bi-level configuration, as shown in phantom in FIG. 4, the segments are independently secured with each lower segment attachment segment 46 removably secured by a hook to the divider. Each attachment segment has a ratcheting device 53 for tightening, and optionally uses a hook/ratchet assembly as shown in FIG. 1.

The attachment devices 41A in the side straps can be used for extra tightening of the netting by using another strap with a pair of hooks (not shown), one secured to the device 41A and another to the rail car.

Although the present invention has been described in considerable detail with reference to certain preferred versions other versions are possible. For example, the attachment segments can be extensions of the side straps or separate straps. Also, the straps that make up the netting or web can be stitched together, or can just be interwoven and secured at their ends. The net segment can generally be installed in any order unless physically impossible. Generally tightening of the nets is effected after they are hooked into position. Thus the claims provided herewith should not be limited to the description of the preferred versions of the invention.

What is claimed is:

1. A rail car safety system comprising:
a) a tri level rail car having a bottom level, a middle level, and a top level, the bottom level having a floor, the top level having a roof, and a first divider between the middle level and the bottom level and a second divider between the middle level and the top level, each level having an exit at least 8 feet wide defined by side walls of the rail car; and
b) a flexible net system removably secured across only a portion of each exit, the net system comprising a lower segment for the bottom level, a central segment for the middle level, and an upper segment for the top level, each net segment being sufficiently large to block at least 50% of the width of its respective exit and sufficiently small to leave an egress and entrance at least about 2 feet wide between the net segment and each of the side walls,
each segment comprising criss-crossed straps with a bottom strap, a top strap, opposed side straps, a side strap attachment device secured to each side strap, and a pair of attachment sections extending beyond the top strap,
the lower segment removably attached to the floor by a pair of hooks,
the central segment removably attached to the first divider by a pair of hooks,
the upper segment removably attached to the second divider by a pair of hooks,
each lower segment attachment segment removably secured to one of the middle segment side strap attachment devices,
each central segment side strap removably to one of the upper segment side strap attachment devices, and
each upper segment side strap removably secured by a hook to the roof or an upper portion of one of the side walls; and
c) a ratchet for each upper segment attachment segment for tightening.

2. A rail car safety system comprising:
a) a bi level rail car having a bottom level and a top level and a divider therebetween, the bottom level having a floor, the top level having a roof, and each level having an exit at least 8 feet wide defined by side walls of the rail car; and
b) a flexible net system removably secured across only a portion of each exit, the net system comprising a lower segment for the bottom level, and an upper segment for the top level, each net segment being sufficiently large to block at least 50% of the width of its respective exit and sufficiently small to leave an egress and entrance at least about 2 feet wide between the net segment and each of the side walls,
each segment comprising criss-crossed straps with a bottom strap, a top strap, opposed side straps, and a pair of attachment sections extending beyond the top strap,
the lower segment removably secured to the floor by a pair of bottom hooks and the upper segment removably attached to the roof or an upper portion of one of the side walls by a pair of top hooks;
the upper segment removably attached to the divider by a pair of top segment bottom hooks;
each lower segment side strap removably secured to one of the upper segment bottom hooks; and
c) a ratchet for each attachment section for tightening the lower and upper segments independently.

3. A rail car safety system comprising:
a) a bi level rail car having a bottom level and a top level and a divider therebetween, the bottom level having a floor, the top level having a roof, and each level having an exit at least 8 feet wide defined by side walls of the rail car; and
b) a flexible net system removably secured across only a portion of each exit, the net system comprising a lower segment for the bottom level, and an upper segment for the top level, each net segment being sufficiently large to block at least 50% of the width of its respective exit and sufficiently small to leave an egress and entrance at least about 2 feet wide between the net segment and each of the side walls,
each segment comprising criss-crossed straps with a bottom strap, a top strap, opposed side straps, and a pair of attachment sections extending beyond the top strap,
the lower segment removably secured to the floor by a pair of bottom hooks and the upper segment removably attached to the roof or an upper portion of one of the side walls by a pair of top hooks;
the upper segment removably attached to the divider by a pair of top segment bottom hooks; and
each lower segment attachment segment removably secured to one of the side strap attachment devices; and
c) a ratchet for each attachment section for tightening the lower and upper segments independently.

4. A rail car safety system comprising:
a) a bi level rail car having a bottom level and a top level and a divider therebetween, the bottom level having a floor, the top level having a roof, and each level having an exit at least 8 feet wide defined by side walls of the rail car; and
b) a flexible net system removably secured across only a portion of each exit, the net system comprising a lower segment for the bottom level, and an upper segment for the top level, the net being sufficiently large to block at least 50% of the width of the exit and sufficiently small to leave an egress and entrance at least about 2 feet wide between the net segment and each of the side walls,
each segment comprising criss-crossed straps with a bottom strap, a top strap, opposed side straps, a side strap attachment device secured to about the longitudinal middle of each side strap, and a pair of attachment sections extending beyond the top strap,
the lower segment removably secured to the floor by a pair of bottom hooks and the upper segment removably attached to the roof or an upper portion of one of the side walls by a pair of top hooks;
the upper segment removably attached to the divider by a pair of top segment bottom hooks; and
each lower segment side strap removably secured to one of the upper segment bottom hooks; and
c) a ratchet for each upper segment attachment section for tightening the net system.

5. The rail car safety system of claim 4 wherein each ratchet is attached to one of the upper segment top hooks.

6. A rail car safety system comprising:
a) a rail car having an exit at least 8 feet wide defined by side walls of the rail car; and b) a flexible net removably secured across only a portion of the exit, the net being sufficient large to block at least 50% of the width of the exit and sufficiently small to leave an egress and entrance about 2 feet wide between the net and one of the side walls.

7. The rail car safety system of claim 6 wherein the net is formed of straps including a top strap, a pair of opposed side straps, and a pair of a tie-on sections extending beyond the top.

8. The system of claim 7 wherein each side strap has an attachment device at about the longitudinal middle thereof.

9. The system of claim 8 wherein the attachment devices are D-rings.

10. The rail car safety system of claim 6 wherein the net is sufficiently small to leave an egress and entrance about 2 feet wide between the net and both of the side walls.

11. A method for preventing injuries to personnel working on a tri-level rail car comprising a bottom level, a middle level, a top level, a first divider between the middle level and the bottom level, and a second divider between the middle level and the top level, each level having an exit at least 8 feet wide defined by side walls of the rail car, the bottom level having a floor, the top level having a roof, each level having an exit, the method comprising the steps of:
   a) selecting first, second, and third flexible nets, each net comprising criss-crossed straps with a bottom strap, a top strap, opposed side straps, and an attachment section extending beyond the top strap, the attachment section having a plurality of attachment devices;
   b) removably attaching the first net to the floor by a pair of hooks,
   c) removably attaching the second net to the first divider by a pair of hooks;
   d) removably attaching the third net to the second divider by a pair of hooks;
   e) removably securing each first net attachment section to one of the second net side straps;
   f) removably securing each second net attachment sections to one of the second net side straps;
   g) removably securing each third net side strap by a hook to the roof or an upper portion of one of the side walls; and
   h) tightening each third net attachment section with a ratchet mechanism for tightening the third net,
   i) wherein each net blocks at least 50% of the width of its respective exit and leaves an unobstructed egress and entrance at least about 2 feet wide between the net and each of the side walls.

12. A method for preventing injuries to personnel working on a bi-level rail car comprising a bottom level, a top level, and a divider between the bottom and top levels, each level having an exit at least 8 feet wide defined by side walls of the rail car, the bottom level having a floor, the top level having a roof, the method comprising the steps of:
   a) selecting first and second flexible nets, each net comprising criss-crossed straps with a bottom strap, a top strap, opposed side straps, and an attachment section extending beyond the top strap, the attachment section having a plurality of attachment devices;
   b) removably securing the first net to the floor by a pair of bottom hooks and removably securing the second net to the roof or an upper portion of one of the side walls by a pair of top hooks;
   c) removably attaching the second net to the divider by a pair of top net bottom hooks; and
   d) removably anchoring each first net attachment section; and
   e) tightening each attachment section of at least the second net,
   wherein each net blocks at least 50% of the width of its respective exit and leaves an unobstructed egress and entrance at least about 2 feet wide between the net and each of the side walls.

13. The method of claim 12 wherein the step of removably anchoring each first net attachment section comprises attaching each first net attachment section to the divider.

14. The method of claim 12 wherein the step of removably anchoring each first net attachment section comprises attaching each first net attachment to one of the second net side straps.

15. The method of claim 12 wherein the step of removably anchoring each first net attachment section comprises attaching each first net attachment to one of the top net bottom hooks.

16. The system of claim 1 wherein each side strap attachment device is at about the longitudinal middle of its respective side strap.

17. The system of claim 1 comprising a plurality of attachment device on each attachment section.

* * * * *